No. 657,495. Patented Sept. 4, 1900.
W. H. MITCHELL.
TIRE.
(Application filed May 21, 1900.)

(No Model.)

Witnesses:
Jas. J. Maloney
Nancy P. Ford

Inventor,
William H. Mitchell
by J. P. and H. P. Livermore
Attys.

THE NORRIS PETERS CO., PHOTO-LITHO., WASHINGTON, D. C.

UNITED STATES PATENT OFFICE.

WILLIAM H. MITCHELL, OF BOSTON, MASSACHUSETTS, ASSIGNOR OF ONE-HALF TO DUDLEY H. BRADLEE, JR., OF MEDFORD, MASSACHUSETTS.

TIRE.

SPECIFICATION forming part of Letters Patent No. 657,495, dated September 4, 1900.

Application filed May 21, 1900. Serial No. 17,430. (No model.)

*To all whom it may concern:*

Be it known that I, WILLIAM H. MITCHELL, of Boston, county of Suffolk, and State of Massachusetts, have invented an Improvement in Tires, of which the following description, in connection with the accompanying drawings, is a specification, like letters on the drawings representing like parts.

The present invention relates to a rubber tire, and is embodied in a tire of that class in which the tire proper is supported in a channel-iron upon the rim of the wheel and held in position by a fastening-band which extends longitudinally through the rubber, the ends of the said band being drawn together and fastened after the tire is in place.

The invention is mainly embodied in a novel fastening device for the ends of the band, which ends are connected together independently of the channel-iron or wheel-rim, so that the tire as a whole is not positively prevented from longitudinal movement in the channel-iron.

It is the object of the invention to obtain a practical fastening device which will firmly connect the ends of the band and which may be easily applied.

The fastening device embodying the invention consists of a locking member the body portion of which is arranged to underlie the ends of the fastening-strip when the said ends are drawn together and is provided with projections extending upward from the said body portion and adapted to enter lateral notches formed in opposite sides of the fastening-strip, the said projections being somewhat longer than the thickness of the fastening-strip, so that they can be bent down over the surface of said strip after the parts are in place, thereby securely fastening all of the parts together. The body portion of the fastening device and the ends of the locking projections are shown as comparatively thin, so that when the said device is in place it does not materially enlarge the fastening-strip at that point, and consequently does not bulge the tire.

Figure 1:
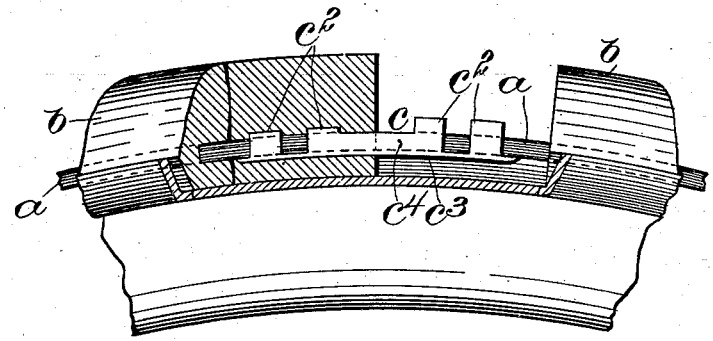
Figure 2:
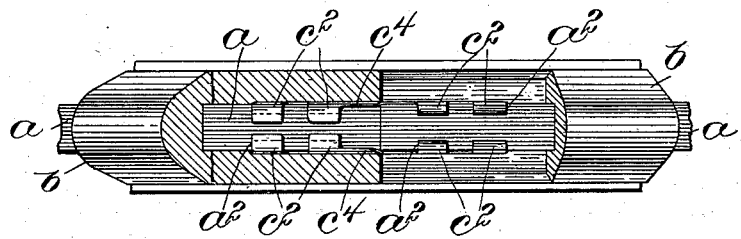

Figure 1 is a side elevation, partly in section, of the tire, the fastening-strip and fastening member being shown in elevation. Fig. 2 is a sectional plan view of the same, and Fig. 3 a top plan view of the blank from which the fastening member is made.

In applying tires of this description to the wheels the fastening-strip $a$ is first inserted in the tire $b$, the latter then being compressed and the ends pushed back, so that when the tire and strip are applied to the wheel the ends of the said strip will be exposed for a certain distance, as shown at the right-hand side of Fig. 1, so that they are accessible for fastening purposes. In accordance with the invention the said strip $a$ is provided near each end with one or more lateral notches $a^2$ at opposite sides, which are arranged to be engaged by vertical projections $c^2$ from a fastening device $c$, which consists of a strip of metal or other suitable material having a body portion $c^3$ arranged to underlie the said strip for a certain distance each way from the point where the ends of said strip come together. In fastening the tire the said ends are drawn together and then forced downward toward the body portion $c^3$ of the fastening member $c$, the projections $c^2$ entering the lateral recesses $a^2$, and thus preventing independent longitudinal movement of the two ends of the strip. To complete the fastening, the said projections $c^2$, which are arranged to extend above the top of the strip $a$, are bent over the top of the said strip, as indicated at the left-hand side of Figs. 1 and 2, and the rubber tire is pulled over the fastening in the usual way until the ends of said rubber tire come together. The main strain on such a fastening device is the longitudinal strain caused by the tendency of the ends of the strip $a$ to pull apart under the strain of the compressed-rubber tire, and in order to afford sufficient strength to withstand such strain without materially increasing the space occupied by the fastening member the main body portions of the projections $c^2$ are made thicker than the ends thereof, so that when said ends are bent over the top of the strip they add very slightly to the thickness of the completed fastening-band, although none of the strength required in the body portions of the said projections is sacrificed.

Figure 3:
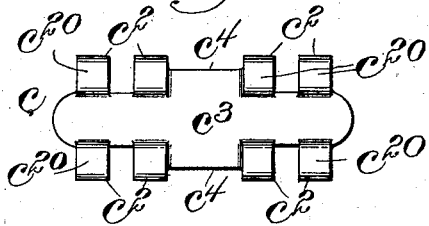

To further increase the strength of the fastening device and to prevent the ends of the band $a$ from working loose by lateral movement, the thin body portion of the fastening device is laterally extended along the middle, as indicated at $c^4$, so as to be bent up and lie along the sides of the fastening-strip $a$, where the ends thereof come together, as indicated, and the said body portion is preferably extended far enough to overlie to some extent the edges of the strip, as shown at the left-hand side of Fig. 2. The body portion, including the part $c^4$, may be made comparatively thin and still contain sufficient material to withstand all the strain brought to bear upon it, so that the entire fastening device when in position takes up very little more space than the body of the strip $a$. As indicated in Fig. 3, the said fastening device may be made from a blank of any suitable material, originally formed flat and then bent up, the body portion $c^3$ and its lateral extension $c^4$ being comparatively thin, while the portions $c^2$ are made thicker at $c^{20}$, so as to have a firm engagement with the recesses $a^2$ when the fastening device is applied.

I claim—

1. In a rubber tire, the combination with a fastening-strip provided near its ends with one or more lateral recesses at opposite sides; of a fastening device having a body portion to underlie the said strip; vertical projections to coöperate with said lateral recesses; and vertical portions extending along the sides of the fastening-strip where the ends thereof meet, substantially as described.

2. In a rubber tire, the combination with a fastening-strip provided near its ends with one or more lateral recesses at opposite sides; of a fastening device having a comparatively-thin body portion adapted to underlie the said fastening-strip, said body portion being extended laterally at the middle of said device and bent upward to lie along the sides of the fastening-strip where the ends thereof meet; and projections adapted to be bent upward to enter the recesses in the fastening-strip, said projections being mainly thicker than the body portion and having thinner extended portions to be bent over the surface of the fastening-strip, substantially as described.

In testimony whereof I have signed my name to this specification in the presence of two subscribing witnesses.

WILLIAM H. MITCHELL.

Witnesses:
 HENRY J. LIVERMORE,
 JAS. J. MALONEY.